United States Patent [19]

Proctor et al.

[11] Patent Number: 4,967,567

[45] Date of Patent: Nov. 6, 1990

[54] SYSTEM AND METHOD FOR DIAGNOSING THE OPERATION OF AIR CONDITIONER SYSTEMS

[75] Inventors: Robert H. Proctor, Rossville; Dennis P. Eichenlaub, Kingstown, both of Md.

[73] Assignee: Murray Corporation, Cockeysville, Md.

[21] Appl. No.: 176,539

[22] Filed: Apr. 1, 1988

Related U.S. Application Data

[63] Continuation-in-part of Ser. No. 131,623, Dec. 10, 1987.

[51] Int. Cl.⁵ .............................................. F25B 49/00
[52] U.S. Cl. ...................................... 62/127; 62/129; 62/149; 62/176.1
[58] Field of Search ................. 62/125, 126, 127, 128, 62/129, 130, 176.1, 176.6; 236/94; 165/11.1; 364/551, 557, 558

[56] References Cited

U.S. PATENT DOCUMENTS

| | | | |
|---|---|---|---|
| 3,232,070 | 2/1966 | Sparano | 62/149 |
| 3,686,954 | 8/1972 | Motl | 73/432 |
| 3,699,781 | 10/1972 | Taylor | 62/474 |
| 3,890,836 | 6/1975 | McKenzie et al. | 165/11.1 X |
| 4,106,306 | 8/1978 | Saunders | 62/149 |
| 4,220,010 | 9/1980 | Mueller et al. | 62/126 |
| 4,261,178 | 4/1981 | Cain | 62/149 |
| 4,285,206 | 8/1981 | Koser | 62/126 |
| 4,363,222 | 12/1982 | Cain | 62/292 |
| 4,364,236 | 12/1982 | Lower et al. | 62/77 |
| 4,381,549 | 4/1983 | Stamp, Jr. et al. | 62/126 |
| 4,407,141 | 10/1983 | Paddock | 62/130 |
| 4,441,330 | 4/1984 | Lower et al. | 62/149 |
| 4,476,688 | 10/1984 | Goddard | 62/149 |
| 4,488,409 | 12/1984 | Hara | 62/127 |
| 4,513,578 | 4/1985 | Proctor et al. | 62/149 |
| 4,539,817 | 9/1985 | Staggs et al. | 62/149 |
| 4,554,792 | 11/1985 | Margulefsky et al. | 62/77 |
| 4,611,470 | 9/1986 | Enström | 62/127 |
| 4,624,112 | 11/1986 | Proctor | 62/149 |
| 4,646,527 | 3/1987 | Taylor | 62/85 |
| 4,663,940 | 5/1987 | Suzuki et al. | 62/127 |
| 4,688,388 | 8/1987 | Lower et al. | 62/149 X |
| 4,688,389 | 8/1987 | Iida | 62/127 |
| 4,755,957 | 7/1988 | White et al. | 62/126 X |

Primary Examiner—Harry B. Tanner
Attorney, Agent, or Firm—King & Schickli

[57] ABSTRACT

A microprocessor provides a diagnostic capability, and includes tables of acceptable values of parameters, such as air discharge temperature, suction pressure, etc., for different automobile makes and air conditioner types; provision is made for adjusting the acceptable ranges of such values due to one or more ambient factors, of which ambient relative humidity may be one. The microprocessor, after determining whether the air conditioning system has a cycling or a non-cyling clutch and providing a valid set of actual system values based on whether the clutch is cycling or non-cycling, compares actual values to acceptable value ranges of the air conditioner operating values, and displays possible causes of air conditioner malfunction on a video screen. Self-testing of both the microprocessor and associated electrical elements, and of mechanical elements such as conduits, valves and a scale is performed. the operator may command the microprocessor to display, in smaller print, a relatively large volume of detailed instrucitonal material dealing with specific checking procedures or repair. An air conditioner charging station withdraws refrigerant from an air conditioner, reclaims it by removing certain materials, and returns the reclaimed refrigerant to the same air conditioner from which it was withdrawn, and also provides new, make-up refrigerant to the air conditoner, in the amount necessary to make a full charge.

20 Claims, 4 Drawing Sheets

SYSTEM AND METHOD FOR DIAGNOSING THE OPERATION OF AIR CONDITIONER SYSTEMS

This application is a continuation-in-part of U.S. application Ser. No. 131,623 filed Dec. 10, 1987, entitled "AIR CONDITIONER CHARGING STATION WITH SAME REFRIGERANT RETURN AND METHOD".

BACKGROUND OF THE INVENTION

The present invention relates to a system for diagnosing the operation or servicing of air conditioner systems, such as automobile air conditioner systems, for use alone or in conjunction with an automatic air conditioner charging station for charging refrigerant and oil into air conditioner systems.

There have been provided disclosures of a number of systems for diagnosing the operation or servicing of such air conditioners. Motl U.S. Pat. No. 3,686,954 provides a system for testing or diagnosing an air conditioner using solenoid valves actuated by manually operated switchers; the temperatures and pressures of the system are measured and readouts are provided by gauges.

Suzuki et al. U.S. Pat. No. 4,663,940 disclose a self-diagnostic apparatus for an automobile air conditioner which utilizes a microprocessor, input signals to which include sensing the position of dampers in air flow ducts. Also, of general interest are Hara U.S. Pat. No. 4,488,409 and Iida U.S. Pat. No. 4,688,389.

A number of apparatus have also been provided for automatically charging such air conditioners. Among those are Proctor et al. U.S. Pat. No. 4,513,578 and Proctor U.S. Pat. No. 4,624,112. The former patent discloses an air conditioner charging station having a weighing scale on which are mounted reservoirs for oil and refrigerant, and an electronic sequencing unit, or microprocessor, which senses the weight loss of the reservoirs as first oil is charged into the air conditioner and then refrigerant is charged into the air conditioner, the amount of each which is charged into the air conditioner being determined by an operator entering into the computer the required amounts of oil and refrigerant for a particular air conditioner. Proctor U.S. Pat. No. 4,624,112 discloses a system of that general type, in which there is provided a conduit connecting the high and low pressure side conduits, called a cross-over conduit, and having a solenoid operated valve in it, together with a solenoid operated dump valve for dumping refrigerant and oil.

Sparano U.S. Pat. No. 3,232,070 conducts withdrawn refrigerant through a compressor and condenser, and then to a drier strainer, from which it is placed into a storage tank.

Taylor U.S. Pat. No. 3,699,781 provides a refrigerant recovery system in which the refrigerant gas is cooled in order to remove liquid by causing condensation in a coil, prior to introduction of the refrigerant into a drier.

Koser U.S. Pat. No. 4,285,206 discloses a system which is capable of simultaneously connecting a refrigerant recovery and purificatio apparatus to the air conditioner systems of two vehicles and includes a reclaim refrigerant tank mounted on a scale, and a tank for new refrigerant, one air conditioner system being recharged with reconditioned refrigerant while the other air conditioner system is having the refrigerant therein withdrawn for reclaiming.

Lower et al. U.S. Pat. No. 4,364,236 and Lower et al. U.S. Pat. No. 4,441,330 provide a system in which refrigerant is withdrawn from an air conditioner and passes through a particulate filter, an evaporator, an oil separator, a compressor, a condenser, and to a reservoir, and thence to a purifier, purified refrigerant from the reservoir being charged into an air conditioner being serviced; a microprocessor is used to effect the sequencing of the operations.

Goddard U.S. Pat. No. 4,476,688 discloses a refrigerant recovery and purification system in which refrigerant is withdrawn from an air conditioner and passed through an oil separator and a filter-drier by a compressor and into a receiving tank for the reclaimed refrigerant. The refrigerant is delivered from the reclaim tank, for charging into the air conditioner. A purge valve and a high pressure switch for a condenser are provided to bleed off air when air pressure in the condenser-evaporator becomes excessive. Such excess pressure causes the compressor to be shut down.

Margulefsky et al. U.S. Pat. No. 4,480,446 provides a system for rehabilitating refrigerant including a filtering tank with a disc-shaped filter.

Taylor U.S. Pat. No. 4,646,527 provides a refrigerant recovery and purification system which includes a compressor and an oil separator, and accumulators having heat exchange coils in them, the recovered refrigerant being placed in a storage tank; in this system, distillation is utilized to separater oil and other impurities from the refrigerant.

Cain U.S. Pat. No. 4,261,178 and Cain U.S. Pat. No. 4,363,222 disclose a refrigerant recovery system in which refrigerant is withdrawn and directed to a cylinder on a scale; there is also disclosed a separate system in which a pump produces a vacuum in a tank, which is then connected with an air conditioner in order to remove part of the refrigerant from it.

Staggs et al. U.S. Pat. No. 4,539,817 provides a refrigerant recovery apparatus which includes a compressor and filters, and a storage tank.

Saunders U.S. Pat. No. 4,106,306 provides a charging apparatus for charging a refrigeration system of the type having a capillary tube, and discloses an electrical circuit for controlling the charging, which circuit receives data relating to indoor and outdoor temperature, to suction line temperature and to suction line pressure.

SUMMARY OF THE INVENTION

A diagnostic apparatus for an air conditioner system such as an automobile is provided including a microprocessor which is furnished with input data such as ambient temperature and humidity, discharge pressure, discharge temperature and suction pressure, as well as information relative to cycling of air conditioners having clutches. The microprocessor is also provided with ranges of acceptable values for variable parameters of the air conditioner, and, more particularly, with such acceptable ranges for air conditioners based upon the automobile manufacturer and type of air conditioner in the automobile. Such data is input to the microprocessor by the operator, and formulas for the establishment of acceptable ranges of values are adjusted in accordance with an ambient factor, such as humidity. The microprocessor determines whether the air conditioner clutch is of the cycling or non-cycling type; obtains a valid set of actual values of parameters including discharge pressure, suction pressure, and discharge air temperature, depending on whether the system is cycling or non-cycling; and determines based on such data the most likely fault or faults in the air conditioner for a particular set of actual values when compared with the noted acceptable ranges, and provides a signal for the likely cause or causes of a default. These possible defaults are displayed on a video screen for the operator.

The microprocessor employs three systems running simultaneously to determine whether the air conditioner clutch is of the cycling or non-cycling type and to extract a valid set of actual values of system parameters. All of these systems share a plurality of registers R[1]–R[5] for storing sets of actual system values of discharge pressure, suction pressure and discharge air temperature, and a first timer and measurement means for initiating measurement of a set of such data.

The first system determines whether or not the clutch is cycling. It includes a first comparator for comparing the absolute value of the difference between the contents of R[1] and R[n] to a preset first threshold and a second timer for generating a signal if it detects output from the comparator within a preset interval.

The second system extracts a valid set of actual values from R[1]–R[n] for a non-cycling clutch. It includes a second comparator for comparing the absolute value of the difference between the discharge pressures in R[1] and R[5] to a preset second threshold, a third comparator for comparing the absolute value of the difference between the suction pressures in R[1] and R[5] to a preset third threshold, a first AND gate for receiving the output of the second timer, and the first and second comparators, and a first gate for providing the values in R[1] upon receipt of a signal from the first AND gate. The values in R[1] represent the most recent data which meet the comparator criteria for diagnosis.

The third system extracts a valid set of actual values from R[1]–R[n] for a cycling clutch. It includes a fourth comparator for comparing the absolute value of the difference between the discharge pressures in R[2] and R[3] to preset fourth and fifth thresholds, a fifth comparator for comparing the absolute value of the difference between the discharge pressures in R[1] and R[2] to the fourth and fifth preset thresholds, a second AND gate which receives the outputs of the fourth and fifth comparators with respect to the fourth preset threshold, and a third AND gate which receives the outputs of the fourth and fifth comparators with respect to the preset fifth threshold. The second and third AND gates determine whether the discharge pressure is increasing or decreasing. A flip flop receives the output from the second timer and the second AND gate, while a fourth AND gate receives the output from the second timer, the flip flop, and the third AND gate. A second gate provides the values in R[3] upon receipt of a signal from the fourth AND gate. The values in R[3] represent the first set of data which includes the maximum discharge pressure while the system is cycling.

An air conditioner charging station or apparatus is also provided in which refrigerant is withdrawn from an air conditioner, such as in an automobile, is reconditioned or reclaimed, as by removing at least one of such extraneous or contaminant elements as oil, particles of metal, and liquid refrigerant, and there is returned to the air conditioner being serviced substantially only reclaimed refrigerant from that air conditioner. The apparatus includes conduits which are connected to the high pressure and low pressure sides of an air conditioner, there being in the apparatus, in series, a separator, a compressor, a condenser, and a reclaimed refrigerant cylinder or tank. There are also provided a tank containing new refrigerant, and a tank or cylinder of oil, all three tanks or receivers having means to measure the amount of material dispensed, such as a scale upon which they rest. To achieve the return of substantially only the same refrigerant, after it has been reclaimed, to the air conditioner from which it was withdrawn, the amount of reclaimed refrigerant delivered to or from the reclaimed refrigerant cylinder has the quantity thereof measured, as by determining weight added, or lost by dispensing; refrigerant from the new make-up refrigerant cylinder is added to the charge to the air conditioner to the extent necessary, to make up a full charge. Pressure operated switches or transducers: are provided at the high and low pressure sides of the compressor of the air conditioner, another at the outlet of the separator and another at the outlet of the compressor. A dump valve is provided for discharging to the atmosphere material such as non-condensible gases, which may have collected in the reclaim cylinder and/or in the condenser, the dump valve being connected to the inlet to the condenser. The reclaim cylinder is located at a lower level than the condenser, so that such gases may rise from the reclaim cylinder to the top of the condenser, for eventual evacuation. The pressure switch at the inlet of the condenser controls, through a microprocessor, the start-up of the compressor, and if there is an unsuitable differential between the inlet and outlet pressures of the compressor, a by-pass circuit is provided for by-passing high pressure refrigerant from the discharge side of the compressor to the inlet side of the compressor, for substantially equalizing the system compressor inlet and outlet pressures.

The separator has a float-operated switch, which may be either a contact switch or a magnetic switch, actuated when the float rises to a predetermined level, the switch controlling, through the microprocessor, the motor of the compressor, so that the compressor is automatically stopped upon the accumulation of a predetermined amount of liquid in the separator. The separator includes a post dependent from a cast metal cap, and a plate on the post above the float supporting desiccant, which is thereby maintained above the liquid level. The post carries the float-operated switch. The inlet of the separator is laterally of and beneath the float, so as to prevent the discharge of material, such as refrigerant& and oil, into the separator from affecting the position of the float.

The system includes a microprocessor which, upon receipt of a signal indicating an excess pressure in the condenser, causes the compressor to be stopped for a predetermined time, after which a motor driven fan for the condenser is activated and material is dumped by opening a dump valve, followed by the opening of a by-pass valve and a by-pass line around the compressor.

Further, there is provision for self-testing of the apparatus including both electronic and electrical component and elements, and mechanical elements such as valves, conduits and a scale. The microprocessor senses, for example, the time required for a pressure charge in a conduit, and compares the sensed time with an established acceptable time.

The microprocessor also provides, upon command, detailed information for conducting a detailed check, or repair, such information being provided by the display of a substantial amount of data in relatively small type, in comparison with the display of general operation instructional data which may be read at a distance from the video screen, as when the operator or mechanic is at the automobile making connections, adjustments, etc.

Among the objects of the present invention is the provision of an air conditioning charging station or apparatus capable of diagnosing any one of a plurality of air conditioners, based on automobile manufacturer and air conditioner type, and displaying to the operator probable causes of faults in the air conditioner being diagnosed.

Still another object is the provision of an air conditioner charging station or apparatus in which there is provided the capability of diagnosing the air conditioner for faults, and for adjusting the acceptable ranges of values in accordance with one or more ambient factors, such as ambient humidity.

Still another object of the present invention is the provision of an air conditioner charging station and method which removes and reconditions refrigerant, and returns to the air conditioner being serviced substantially only reclaimed refrigerant removed from that air conditioner. Another object is to provide an air conditioner charging station apparatus and method in which there is provided a recharging of an air conditioner with substantially only refrigerant removed from that air conditioner and reclaimed, and new refrigerant to the extent necessary to make up a full recharge.

Still another object of the present invention is the provision of an air conditioner charging station in which a separator is provided which has a float-operated cut-off switch for cutting off a compressor, and in which incoming refrigerant does not affect the operation of the float, and, further, a separator for such a system in which dessicant is supported at a level above the highest level of liquid within the separator.

A further object of the present invention is the provision of an air conditioner servicing or charging station having a compressor and a by-pass circuit for equalizing the compressor inlet and discharge pressures.

Yet another object of the present invention is the provision cf an air conditioner charging station or apparatus in which evacuation of non-condensible gases is readily achieved from both a receiver for reclaimed refrigerant and a condenser.

Still another object is to provide an air conditioner charging station having a microprocessor and video screen, with the provision of information on operating steps in relatively large letters, for viewing at a distance, and for selectively displaying a large amount of detailed instructions in small letters, for viewing closer to the video screen.

Other objects and many of the attendant advantages of the present invention will be more readily understood from consideration of the following specification, claims and drawings.

DESCRIPTION OF THE PREFERRED EMBODIMENT

Figure 1:
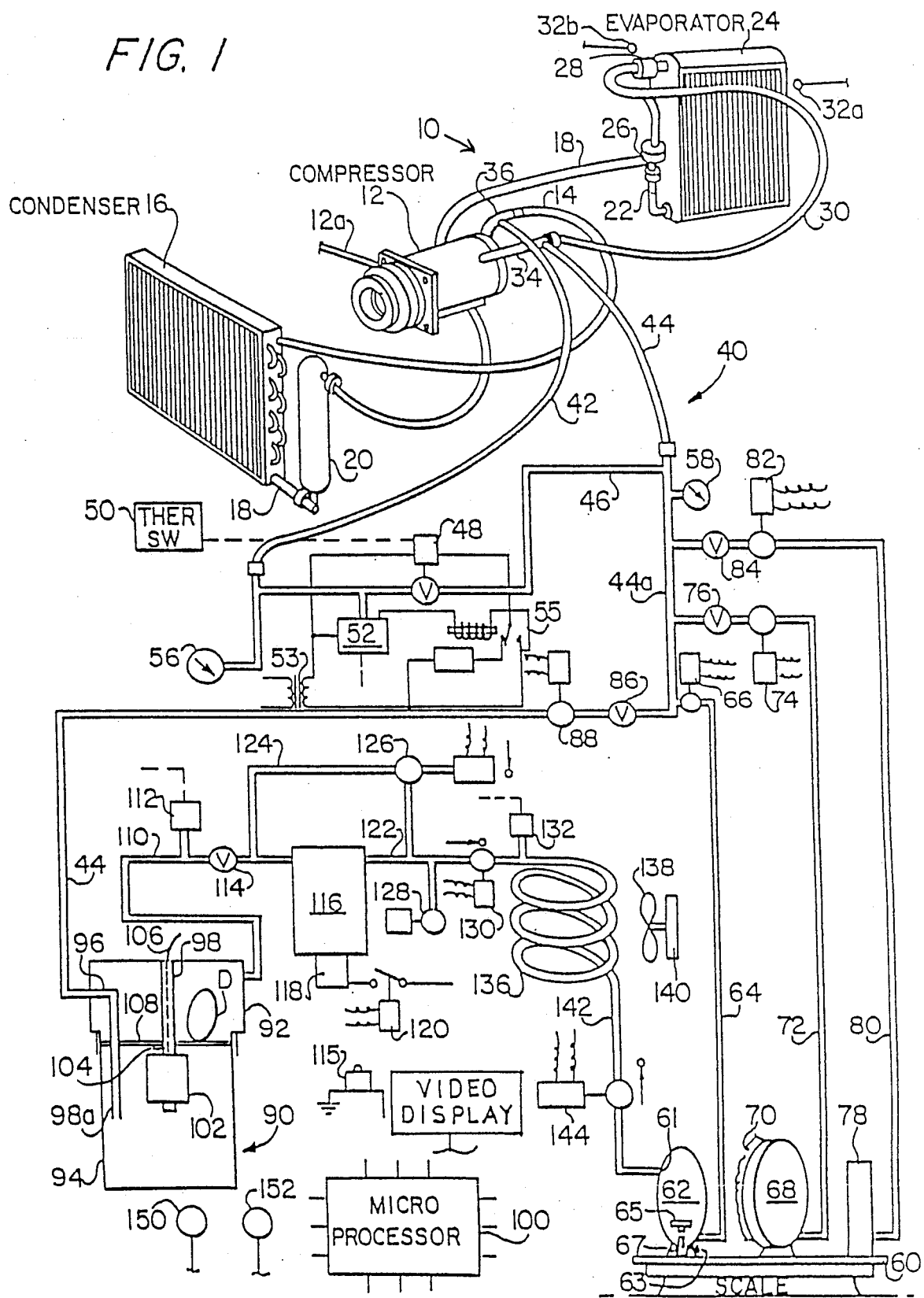
FIG. 1 is partly schematic and representational, showing a conventional air conditioner, and a charging station or system in accordance with the present invention.

Referring now to FIG. 1, there is shown a conventional air conditioner generally designated 10, such as is typically used in automobiles. The air conditioner 10 includes a compressor 12 having a high pressure side from which fluid refrigerant is conducted by a high pressure conduit 14, which is connected to condenser 16. The discharge conduit 18 of condenser 16 may pass through a receiver-drier 20, and is connected to the inlet conduit 22 of evaporator 24 through expansion valve 26. Expansion valve 26 is controlled in known manner by a temperature sensing element 28 attached to the suction conduit 30 extending from evaporator 24 to the low pressure conduit 34 of compressor 12. The high pressure conduit 14 is connected to the high side of compressor 12 through high pressure conduit 36, and to the high pressure conduit 36 there is connected, through a detachable fitting (not shown) a conduit 42, forming a part of an air conditioner charging station; similarly, to the low pressure conduit 34 there is detachably connected a low pressure conduit 44 forming a part of the air conditioner charging station.

A temperature transducer 32a for sensing the temperature of air entering the evaporator 24 is provided, as well as a temperature transducer 32b for sensing the temperature of air after it has passed through the evaporator 24. There is provided, also, a probe 12a for sensing the cycling of the clutch of the compressor 12.

A crossover conduit 46 is connected to the high pressure conduit 42 and the low pressure conduit 44, there being a solenoid operated crossover valve 48 therein controlled by a thermal transducer switch 50. A pressure operated switch or transducer 52 which senses high side pressure, is also connected to the solenoid valve 48, and to an electronic sequencing unit or microprocessor 100. There is also provided a gauge 56 to show the high side pressure. A gauge 58 senses and indicates the low side pressure. These gauges are electronically operated digital displays.

Thermal switch or transducer 50 senses ambient temperature and pressure switch or transducer 52 senses the pressure at the high side of the compressor 12, and is activated at a selected pressure, which, for example, is 120 psig; pressure in excess of 120 psig, for example, will cause the solenoid valve 48 to close, to stop the passage of refrigerant from the high side of the compressor until such time as the pressure falls below the selected amount. The solenoid valve 48 is also connected to the microprocessor 100 and receives command signals from it, as will be explained below. However, such command signals may be overridden by a signal from the thermal switch or transducer 50 if ambient temperature is below a predetermined level, such as 60° F.

The air conditioner charging station 40 further comprises a change of amount sensor, specifically a scale 60, which generates signals proportional to changes in weight of refrigerant and/or oil thereon and which is connected to the microprocessor 100. On the scale 60 are a receiving tank 62 for reconditioned refrigerant, having an outlet at the bottom connected to outlet conduit 64 which is connected through a solenoid valve 66 to an extension 44a of the low pressure conduit 44. A cylinder 68 for storing new make-up refrigerant is also on the scale 60 and may be provided with a heater 70. A conduit 72 connects the make-up refrigerant storing cylinder 68 to the low pressure conduit extension 44a through a solenoid valve 74 and a check valve 76 which prevents flow of fluid from conduit 44a into the cylinder 68.

Preferably, there is also on scale 60 oil storing cylinder 78, connected by conduit 80 to the low pressure conduit extension 44a through solenoid operated valve 82 and check valve 84.

The low pressure conduit 44, 44a is connected through a check valve 86 and a solenoid valve 88 to a separator 90, for separating from gaseous refrigerant other components which may be in refrigerant withdrawn from the air conditioner 10, including oil, liquid refrigerant, and particles such as metal particles which may have come from bearings in the compressor 12. The separator 90, which is schematically shown, includes a cap 92 which may be a casting of a suitable strong metal, there being attached to it a bowl 94 which depends from it, and which is preferably transparent. Bowl 94 is held to the cap 92 by any suitable releasable holding means such as screw threads. The cap 92 is provided with a suitable hose connecting fitting for attachment to the conduit 44a, and has within it an inlet conduit 96 of angular shape, having an arm 96a which extends downwardly into bowl 94 and having its discharge outlet at a relatively low level. A post 98 depends downwardly from the cap 92, and has thereon a float 102 which may be caused to rise on post 98 when oil and/or liquid refrigerant has risen to a sufficient height. The post 98 is hollow, and supports a sensor 104 which is engaged by float 102 when liquid in the bowl 94 has reached a certain height, engagement with sensor 104 causing a signal to be sent to microprocessor 100 through conductor 106. A plate 108 is mounted on the post 98, and serves to support dessicant, as may be provided in a small bag D, in the space within separator 90 which will always be above the level of liquid therein. As many bags D as necessary may be provided, and upon disassembly of the bowl 94 from the cap 92, the dessicant may be replaced.

A conduit 110 extends from the separator 90, and gaseous refrigerant leaving the separator 90 will pass through the desiccant and be dried. Because of the low temperature of the gaseous refrigerant above the liquid level in the separator 90, the dessicant will be at a relatively low temperature, and will operate therefore effectively.

Oil from the refrigerant removed from the air conditioner 10 will be caught in the bowl 94 of separator 90, rather than being discharged. There will also remain in the bowl 94 particles and liquid refrigerant. The oil may contain refrigerant which is dissolved in it. Since the separator 90 is subject to ambient temperature, that refrigerant may boil off, and be recovered. The utilization of a transparent bowl 94 will enable the operator to readily ascertain abnormal conditions relating to the oil in the refrigerant withdrawn from the air conditioner 10, such as whether there is no oil or too little oil, or an undue amount of oil. Thus, the operator would be able to ascertain that the air conditioner 10 has either an inadequate supply of oil or an over supply of oil, as the case may be. With this knowledge, he can check for the reason why the proper oil-to-refrigerant ratio in the air conditioner 10 is not within an acceptable range. The bowl 94 is preferably provided with a gauge, so that a determination can quickly be made whether the amount of oil removed from the refrigerant is within the normal range, and if so, can, upon recharging of the air conditioner 10, command the microprocessor 100 to restore the proper amount of oil to air conditioner 109 from the oil storage tank 78. Further, it will be seen that the discharge end of the conduit 96a is below the float 102, so that entering refrigerant will not impact on the float 102 and alter its normal operation. The float 102 will be lifted only by liquid within the bowl 94, and any foam which may be present in bowl 94 will not have a lifting effect on the float 102, so that thereby a true sensing of the liquid level in bowl 94 may be obtained by the sensor or switch 104.

The conduit 110 which extends from the separator 90 has a pressure switch 112 connected to it, for sensing the pressure within the separator 90. A check valve 114 is included in the conduit 110 to prevent backflow of liquid or pressure into the separator 90. The placement of the check valve 114 in the conduit 110 is preferred, although check valve 114 may be either eliminated, or replaced by a solenoid valve.

Gaseous refrigerant from the separator 90 is delivered by the conduit 110 to a compressor 116 which is driven by a motor 118, the power to which is supplied through a solenoid switch 120. The compressor 116 is of a known type, capable of drawing refrigerant from the air conditioner 10 through the separator 90, and compressing the received refrigerant, which is gaseous. A conduit 122 serves to conduct compressed refrigerant from the compressor 116, and has connected to it a by-pass conduit 124 which extends from the conduit 122 to the conduit 110, having a solenoid operated valve 126 therein. As shown by the symbol adjacent to solenoid valve 126, it will be opened by an overpressure from the conduit 110, but an overpressure from conduit 122 will not open it, so that only when solenoid valve 126 is opened through energization of the solenoid will it be opened and refrigerant be permitted to flow through the by-pass conduit 124.

A solenoid operated dump valve 128 is connected to the conduit 122, and there is provided in the conduit 122 a solenoid operated control valve 130. Also in conduit 122 is a pressure switch 132.

Conduit 122 delivers reclaimed, purified and compressed refrigerant to the condenser 136 which is diagrammatically illustrated as comprising a coil; a fan 138 driven by a motor 140 may be caused to blow air across the condenser 134. condensed refrigerant is delivered through conduit 142 having a solenoid valve 144 therein to the receiver 62, the conduit 142 extending downwardly because the receiver 62 is located at a lower level than the condenser 134, the conduit 142 entering the upper part of the receiver 62.

In operation, the conduits 42 and 44 are connected to the air conditioner 10, and it is assumed that the solenoid valve 48 is closed; it is opened by microprocessor 100 only when charging refrigerant from either the reclaim cylinder 62 or make-up cylinder 68, or when dumping the charge of air conditioner 10, unless it is being closed by the sensing of abnormal temperature by the thermal switch or transducer 50 or abnormal pressure as sensed by the pressure switch or transducer 52. The solenoid valve 88 will be closed, and if the pressure switch 112 which senses the pressure in conduit 110 connecting the separator 90 with the compressor 116 is in the range of 15 to 20 pounds per square inch, pressure switch 112 will cause motor 118 and compressor 116 to be activated. When the pressure falls to approximately 0 psig, solenoid switch 120 will be opened, and the compressor 116 will stop. However, the signal from switch 112 passes through a microprocessor 100 to the solenoid switch 120 (or its equivalent) and under certain circumstances, the signal from pressure switch 112 may be overridden or by-passed so that, for example, when it is necessary to have the compressor pull a vacuum on the air conditioner 10, this may be effected by the overriding or bypassing by the signal from pressure transducer 112.

The purpose of the bypass conduit 124 is to equalize the high and low pressure sides of the compressor 116 since known air conditioner compressors cannot start if there is differential between the low pressure side and the high pressure side which is too great. A compressor without such limitation would not need the by-pass conduit 124. The pressure on the high pressure side of the compressor 116 is sensed by the pressure switch 132 and the pressure on the low pressure side of the compressor 116 is sensed by the pressure switch 112, the signals from these switches being delivered to the microprocessor 100 for processing, and the controlling of the valve 126, to open it, to thereby permit the equalization of the pressures on the high and low pressure sides of compressor 116; when the microprocessor 100 causes the solenoid valve 126 to be opened, to unload the compressor 116, the dump solenoid valve 128 and the solenoid valve 130 in the conduit 122 are both closed. The result is that only a small volume of refrigerant flows from the high pressure side of compressor 116 to the low pressure side, and there is not introduced into the conduit 122 refrigerant from the condenser 136. When the compressor 116 is not being unloaded, the by-pass solenoid valve 126 is closed and the solenoid valve 130 in the conduit 122 to condenser 136 will be opened. When compressor 116 is restarted, control solenoid valve 30 is opened shortly after by-pass valve 126 closes.

In overall operation, the compressor 116 withdraws refrigerant from the air conditioner compressor 12, the refrigerant flowing through the separator where oil, particles such as metal particles, and liquid refrigerant are removed, with reconditioned gaseous refrigerant then flowing to compressor 116 where it is compressed and delivered to the condenser 136, where it is condensed, and caused to flow into the receiving tank 62 for the withdrawn and reconditioned refrigerant. The microprocessor 100 will determine the difference in the weights on the scale prior to the introduction of the withdrawn and reconditioned refrigerant into the receiving tank 62. That withdrawn, reconditioned refrigerant will pass to the compressor 12 of the air conditioner 10 upon the opening of solenoid valve 66 and the closing of the solenoid valve 144 in the conduit 142 leading to the intake of the receiving tank 62. Thus, there will be returned to the compressor 12 from the receiving tank 62 substantially only refrigerant which was withdrawn from compressor 12. In this way, any contamination which may be present in the refrigerant from one air conditioner system 10 in one automobile will not be mixed with refrigerant from another automobile, so that there is thereby avoided the transfer of contaminants from one air conditioner system to another. Thus, substantially only the same reconditioned refrigerant is returned to the air conditioner from which it is withdrawn, and, with the following exception, no refrigerant from another air conditioner is placed into the air conditioner being serviced. That exception is that a very small amount of refrigerant from a servicing operation on one vehicle air conditioner may remain in the condenser 136, and that a very small amount will be delivered to the receiving tank 62 upon the initiation of servicing of a second air conditioner of a second automobile. However, that amount of refrigerant is so small that any contamination will be negligible, due to the extremely small amount of contaminant that may be delivered into the air conditioner of the second vehicle.

If during operation the float 102 rises and strikes the sensor 104, a signal by way of conductor 106 to the microprocessor 100 causes the circuit to motor 118 to be broken, and compressor 116 will stop. There is provided a transparent switch button 115 with a light behind it which flashes at this time, there being provided adjacent to it a legend that the lighted button is to be depressed. Depression of this lighted button-switch will cause the microprocessor to close the solenoid valve 88 and to cause the compressor 116 to operate, to reduce the pressure within the separator 90, the solenoid valve 88 preventing the addition of more freon to separator 90; when the pressure in separator 90 is satisfactorily reduced to approximately 0 psig, this will be sensed by the switch 112, which will provide a signal to microprocessor 100, which will then shut down compressor 116. After that, the bowl 94 may be removed from the cap 92, the bowl emptied and cleaned, and the dessicant bag D replaced.

In some instances, a part of the normal refrigerant charge of a particular air conditioner may have leaked out, so that the amount of withdrawn, reconditioned refrigerant delivered to the receiving tank 62 is not sufficient to provide a complete charge for the air conditioner being serviced. To provide a complete charge, the amount of the deficiency is determined, as explained hereinbelow, and the necessary amount of refrigerant to provide a full charge is withdrawn from the makeup refrigerant cylinder 68. Thus, the air conditioner 10 will receive a full charge made up of one or a first component, which is the same refrigerant that was withdrawn from the air conditioner 10, and which was reconditioned by the separator 90, and to the extent necessary, a second component of new refrigerant from the makeup cylinder 68. As is known, a small amount of oil is usually introduced into the air conditioner during recharging, and this is provided from the oil storage tank 78, through conduit 80 when the solenoid valve 82 is opened.

Returning to FIG. 1, the dump solenoid valve 128 is provided to permit dumping of material to atmosphere. That material may be non-condensible gas, which in most cases is air, which may have been contained in the withdrawn refrigerant. That air would be located in the upper or higher part of the condenser 136, at and near the inlet thereof. This non-condensible gas, or air, would have risen from the liquid refrigerant in the coils of the condenser 136 to the highest part of the condenser coil, liquid being of higher density being in the lower part of the coil of condenser 136. With the compressor 116 stopped, the solenoid by-pass valve 126 will be closed, the condenser valve 130 will be opened, and the dump valve 128 will be opened. Since the condenser 136 is at a higher elevation than the receiving tank 62, any gas which will have accumulated in the receiving tank 62 will, with solenoid valve 144 opened, pass upwardly to and through the condenser coil 136, since the receiving tank 62 is below the condenser 136; that non-condensible gas, or air, will thus also be exhausted from the apparatus through the dump solenoid valve 128. This will avoid the incorporation of non-condensible gas, such as air, in the refrigerant which is returned to the air conditioner 10 which is being serviced.

Purging occurs when an excessive pressure, which may be approximately 325 psig, is sensed by the pressure switch 132. When this level of pressure is sensed, the compressor 116 is stopped, by interrupting the flow of current to the motor 118, and after a time delay, the microprocessor 100 causes the condenser solenoid valve 130 and the dump solenoid valve 128 to open to permit the above described dumping function. The pressure build-up in the condenser 136 will be caused, for example, when the receiving tank 62 is substantially full, when it may contain some air, together with the withdrawn and reconditioned refrigerant in the liquid state. When the receiving tank 60 is full, no more refrigerant can be pumped into it, so that continued operation of the compressor 116 will cause the noted rise in pressure. Also, if the receiving tank 62 is substantially full, and the temperature rises, the refrigerant in the receiving tank 62 will expand, and since the solenoid valve 66 in the outlet conduit 64 is closed, refrigerant must flow out of receiving tank 62 to the condenser 136. This is permitted by the solenoid valve 144 which permits an override as indicated by the symbol adjacent to it, the higher pressure in the receiving tank 62 forcing the valve off of its seat and refrigerant and/or air passing upwardly to the coil of condenser 136. Valve 144 is normally open, except when the apparatus 40 is dispensing oil or refrigerant. The condenser 136 will have part of its coil or coils filled with liquid, but also part thereof will be filled with high pressure gas. For this reason, there is space in the condenser 136 to accept overflow liquid refrigerant from the receiving tank 62. Any gas, as above-explained, will rise upwardly to the top portion of the coil or coils of accumulator 136, and be adjacent the inlet, and will be discharged, as above indicated, during the dumping phase.

Turning now to the operation of the apparatus including the microprocessor, it will be understood that the charging station or the apparatus 40 will include necessary switches, such as a main on/off switch, as well as a video display, various signal lights, and a key pad or pads for the entry of commands.

When the apparatus 40 is turned on, a menu will be displayed on the video screen as follows:
Dump and reclaim
Dump to atmosphere
Service
2 oz. shot
Diagnose
Self-test The operator may choose the "Dump and reclaim" operation, and on command, refrigerant will be withdrawn from the compressor 12 of the air conditioner 10, passed through separator 90, compressor 116, condenser 136 and to the receiving cylinder 62. When the suction pressure reaches 0 psig, the apparatus will stop and that operation will have been completed.

If the operator chooses "Dump to atmosphere," the condenser solenoid valve 130 will be closed and the dump solenoid valve 128 will be opened, and the refrigerant will be withdrawn from the air conditioner 10 by compressor 116, passing through separator 90, and will dump to atmosphere, the operation continuing as before, until the pressure of the system is 0 psig, as sensed by pressure transducer 112. This operation will then stop.

In utilizing either the "Dump and reclaim" or the "Dump to atmosphere" modes, if, as sometimes happens, the pressure sensed by pressure transducer 112 rises, the compressor 116 will again be activated. In both of these operations, since the withdrawn refrigerant passes through the separator 90, the operator will be enabled to visually inspect the removed oil through the transparent bowl 94 to determine any abnormalities, as an aid to diagnosing any faults in the air condition 10. It is noted that the machine does not turn off when the compressor is stopped during these operations, but remains active so that any rise in pressure will be sensed. Such pressure rise may be due, for example, to effervescence of the refrigerant from the oil in the system.

If the "Service" mode is selected there is displayed on the video screen a menu of instructions for the operator, requiring him to enter the length of time that the evacuation of the air conditioner system is to proceed, the amount of oil to be charged into the air conditioner, the amount of refrigerant to be charged into the air conditioner, and whether the operator wishes to interrupt operations after the evacuation of the air conditioner in order to evaluate the air conditioner for leaks. It will be understood that this service operation will follow either the above-described "Dump and reclaim" operation or "Dump to atmosphere" operation. If the operator does not choose to "dump" but enters a requirement for vacuum, the apparatus automatically performs a "Dump and reclaim" function before performing the vacuum function. The operator can cause the function to be "Dump to atmosphere" or "vacuum to atmosphere" if he so chooses.

There is also displayed to the operator an option of adding a small amount of refrigerant, such as 2 oz., after the air conditioner has been charged with refrigerant from either receiving tank 62 to make-up refrigerant storage tank 68, or both. This operation may also be performed after the air conditioner 10 has been evacuated, so that it is charged with refrigerant in order that it may be tested for leaks.

The "Diagnose" operation permits the operator, with the aid of the apparatus 40, to diagnose the vast majority of automobile air conditioners now in use to determine if they are functioning satisfactorily, or if not, to determine the cause of the malfunction. Air conditioners can be diagnosed by observing the ambient, inlet, and discharge air temperatures; the suction and discharge pressures; and the relative humidity. These parameters can be compared to expected values and identify most malfunctions.

However, many automotive air conditioners regulate their output by cycling the clutch on and off via an electric clutch. In these systems, the suction and discharge pressure change dramatically when the clutch cycles on and off. When the compressor runs, the suction pressure decreases and the discharge pressure increases. Conversely, when the compressor is not running, the suction pressure increases and the discharge pressure decreases. For example, a typical system might see the suction pressure change from 50 pounds to 30 pounds in two seconds when the clutch turns on, and increase from 18 pounds to 30 pounds in two seconds when the clutch turns off. The most accurate diagnosis can be done if the pressures at the end of the clutch cycle are used. The objective is to obtain a set of data that is best indicative of system performance.

This objective can be accomplished by measuring the clutch voltage, continuously monitoring the pressures, and using the last values observed before the clutch turns off.

When the "Diagnose" function is selected, the video screen will give such instructions as to connect the diagnostic sensors. These are the evaporator input air temperature from the transducer 32a and the evaporator discharge air temperature from the transducer 32b. In addition, an ambient humidity transducer 150 will have been connected to the microprocessor, as well as an ambient temperature transducer 152. The operator will be instructed to start the engine and set it at a selected R.P.M. He is then instructed to check all of the air conditioner controls and to connect the probe 12a to the clutch of the compressor 12, so that the microprocessor 100 will receive signals indicative of the cycling of the clutch of compressor 12. The controls are required to be set for maximum cold temperature, and the blower (not shown) of the air conditioner 10 to be placed at its highest speed. Also, the operator will be instructed to open both front doors of the automobile, and then to signal the microprocessor 100 when these steps have been accomplished. The diagnosis is then performed, as will be described hereinbelow.

However, measuring clutch voltage is not always a practical solution because the clutch wires are not always easily accessible. An indicative set of data can also be attained by monitoring the suction pressure, and using measurements taken when the suction pressure is at a minimum, since the suction pressure is minimum when the clutch turns off for most air conditioning systems. However, this does not work for expansion valve thermostatic switch systems, since the suction pressure is not at a minimum when the clutch turns off.

The preferred method of obtaining a set of data is to monitor the discharge pressure, and use measurements taken when the discharge pressure is at a maximum, since when the clutch turns off, the discharge pressure is maximum or stabilized for all known automotive air conditioning systems. Ideally the diagnostic system would automatically detect the large, regular variations in discharge pressure and if the air conditioner has a cycling clutch, use variables measured when the discharge pressure is maximum to perform the diagnosis.

Some other automobiles have a separate cooling fan for the air conditioner that cycles on and off, controlling the air conditioners discharge pressure (and to a lesser extent, the suction pressure). For these cars, the discharge pressure increases when the fan is off and decreases when the fan is on. The change in discharge pressure can be very large—perhaps 100 pounds—but the rate of change is much more gradual, roughly approximating a sinusoid. Changes in suction pressure are much less dramatic and are correspondingly less important. For these cars, it is desirable to use the discharge pressure just as the cooling fan turns on, i.e., the maximum discharge pressure.

This objective can be accomplished by measuring the fan voltage, continuously monitoring the pressures, and using the last values observed before the fan turns on. However, this solution requires extra hookups for the mechanic which may be difficult.

The preferred method of obtaining a set of data for these systems is to monitor the discharge pressure, and use values measured when the discharge pressure is maximum. Ideally, the diagnostic system would automatically detect the large regular variations in discharge pressure and if the air conditioner has a cycling fan, use variables measured when the discharge pressure is maximum to perform the diagnosis.

Finally, some cars do not have a port where discharge pressure can be conveniently observed. In these cases, the diagnosis should be performed without knowing the discharge pressure, if possible.

When the diagnostic function is requested, the mechanic is asked several questions such as type of car, type of air conditioner., etc. The last question asked is whether he has connected the discharge pressure hose or wishes to ignore the discharge pressure. If he chooses to ignore the discharge pressure, the system will monitor the remaining variables (relative humidity, inlet air temperature, ambient air temperature, discharge air temperature, and suction pressure). If these variables indicate that the system is performing normally, the discharge pressure is assumed also to be normal and the mechanic is informed that the system is functioning normally. However, if the monitored variables indicate the system is malfunctioning, the mechanic is given the probable causes of error assuming the discharge pressure is too high, too low, and within normal limits. Some alternative implementations could automatically sense that the discharge pressure is not connected based on the make and model of automobile, absence of fluctuations in discharge pressure, etc. However, these are all inferior because asking the mechanic to provide this information allows the system to remind the mechanic that the diagnosis is less accurate, and because it places the mechanic in control of the machine.

Figure 2:
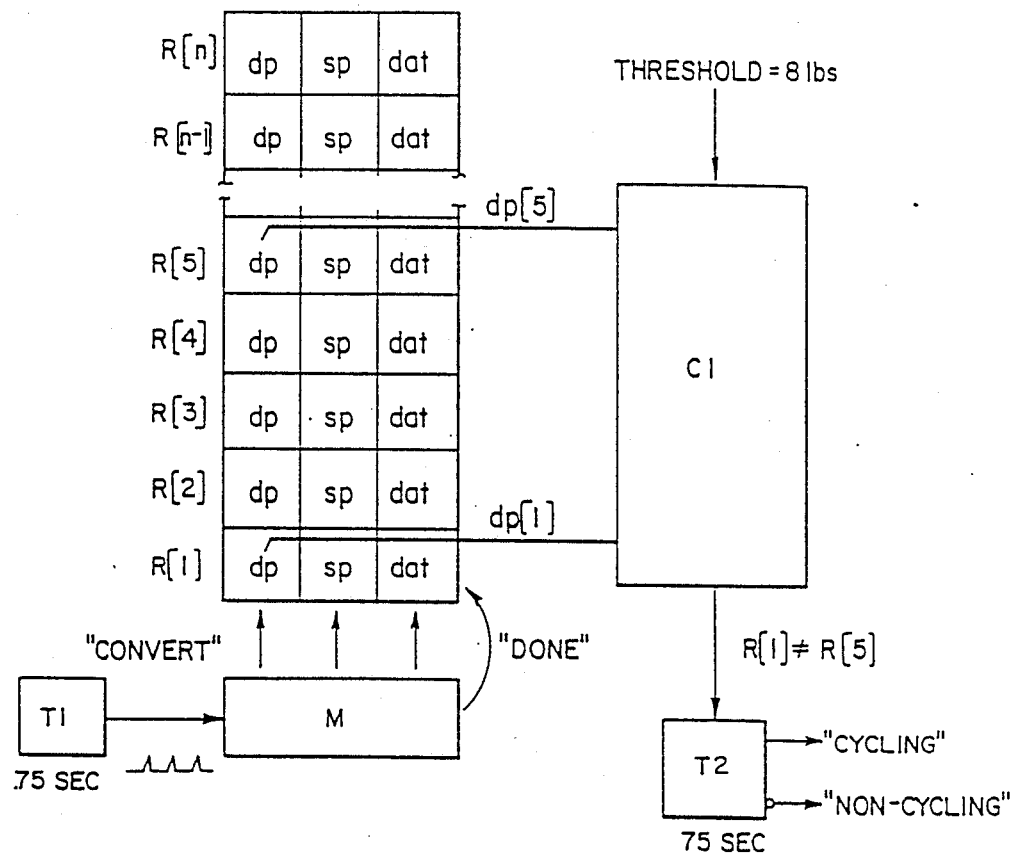
FIG. 2 is schematic, showing a system for sensing automatic cycling of the clutch of an air conditioning system in accordance with the present invention.

Referring now to FIG. 2, there is shown a system for automatically detecting whether the air conditioning system is cycling or non-cycling is described. This system works while monitoring nothing but discharge pressure (or, if discharge pressure is disabled, suction pressure), and works reliably on all known automobiles.

Only discharge pressures will be discussed, since operation is similar if the suction pressure is monitored.

As shown in FIG. 2, the system uses a timer, T1, to initiate a set of measurements. This timer puts out a "convert" pulse at a regular interval. The interval can be set for almost any time. Through experimentation, we have found that an interval of approximately 0.75 seconds is convenient.

The timer T1 triggers a measurement device M, such as an analog to digital converter, to quickly measure the set of data that might be changing. Each set includes a measurement of discharge pressure and suction pressure. Optionally, each set can contain other measurements that might vary on cycling systems, such as discharge air temperature.

The measurement of discharge and suction pressure must be quick enough that there is no appreciable change in either measurement until both measurements are made. For example, assume that discharge pressure is measured first, then suction pressure. The measurements must be fast enough that if the discharge pressure happens to be measured at the very end of the clutch cycle on a cycling clutch air conditioner, the suction pressure has not significantly increased when it is measured. In practice, a good diagnosis can be achieved if the suction pressure has increased one less than one pound during this measurement interval.

When the measurement is completed, the measurement device M sends a "done" strobe that stores the measurement in a bank of registers R[1]-R[n]. At the end of each measurement, the result of the measurement is placed in R[1]. The old contents of R[1] are placed in R[2]. The old contents of R[2] are moved to R[3], and so on until the old contents of R[n−1] are moved to R[n], and the contents of R[n] are discarded.

A comparator device C1 is connected to two registers and monitors the discharge pressure dp (or suction pressure sp) in these two registers. Specifically, comparator C1 monitors whether the absolute value of the difference between the discharge pressure dp of the two registers exceeds a preset threshold. FIG. 2 shows the comparator C1 monitoring the absolute value of the difference between the discharge pressure in registers R[1] and R[5] with respect to a preset first threshold. Although the discharge pressure in R[1] can be compared to the discharge pressure in any register R[x], where x is greater than 1 and less than or equal to n, the threshold can be set to any level. In practice, if T1 has an interval of 0.75 seconds, a threshold of 8 pounds for discharge pressure and 3 pounds for suction pressure work well. It is apparent that, for the example shown, the comparator output signal indicates that the discharge pressure has changed more than 8 pounds in 3 seconds. This signal indicates that the air conditioner might be cycling.

A second retriggerable timer, T2, is also used. The interval of this timer can be set to a wide variety of values. For the illustration in FIG. 2, a value of 75 seconds works well. This timer sets its output ("cycling") whenever the input (R[1] not equal to R[5]) has turned on within the last 75 seconds. If a large change in pressure is detected once every 75 seconds (or faster), the T2 output will remain high (i.e., will be 1) continuously, indicating the air conditioner is cycling. If the pressure is generally stable, the T2 output will remain low (i.e., will be 0) continuously, indicating the air conditioner is non-cycling. If the change in pressure temporarily exceeds the comparator threshold (as might happen when the automobile is first started or if the mechanic quickly changes the engine RPM), the T2 output temporarily goes high, but reverts to its low, non-cycling state after 75 seconds.

It is obvious that this simple system can give incorrect results if the discharge pressure increases, then decreases, then increases again between the measurement in R[1] and R[5]. However, for the values shown, the pressure would have to have two maximums within 3 seconds for this to be a problem. Practical air conditioners are not capable of wide pressure swings at such fast rates.

It should be noted that pulsations from piston-type compressors are not a factor because the long hoses connecting the automobile system to the machine and the plumbing in the machine effectively dampen these high frequency pressure variations.

Figure 3:
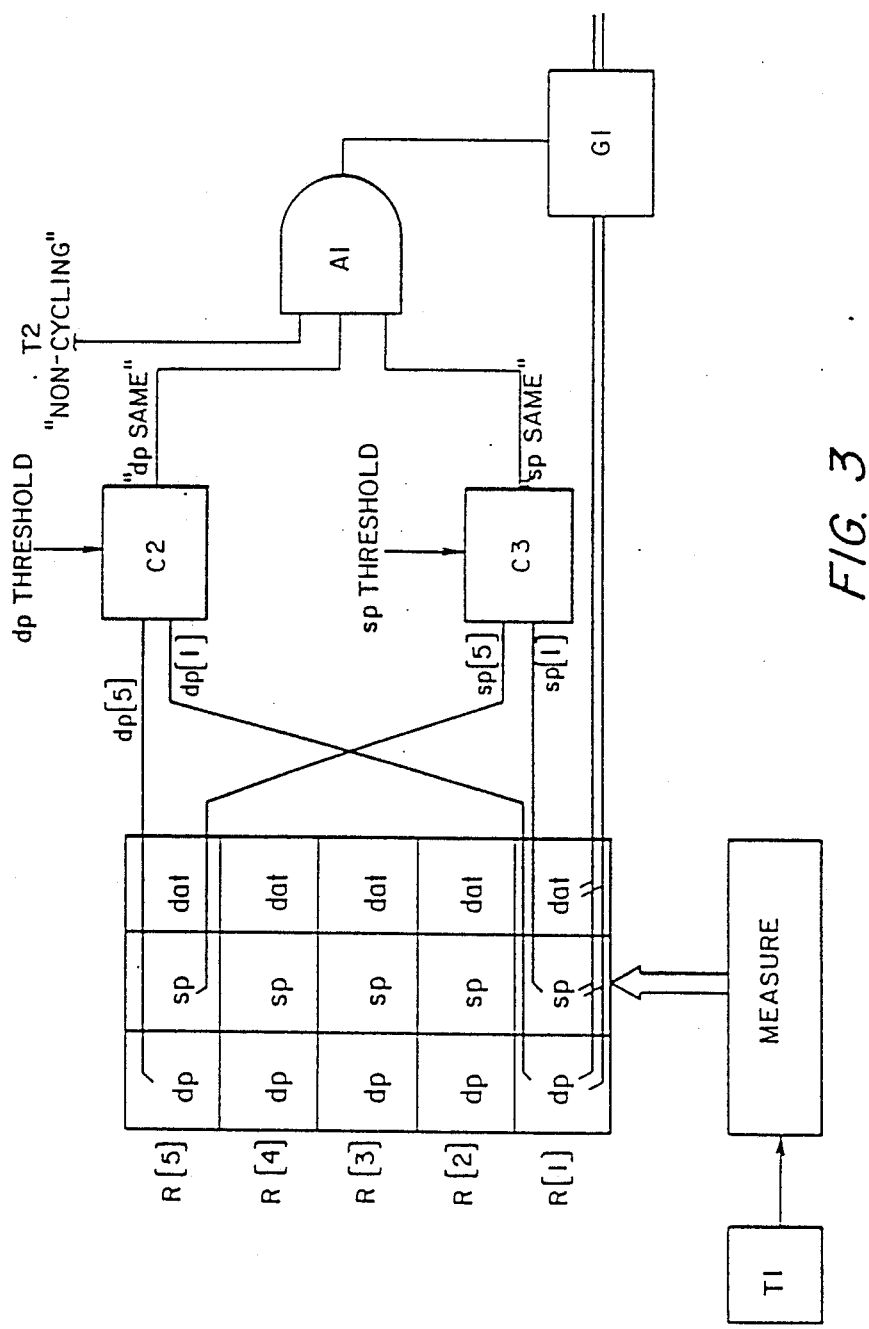
FIG. 3 is schematic, showing a system for determining valid data for non-cycling systems in accordance with the present invention.

A system for determining valid data for non-cycling systems is shown in FIG. 3. The timer T1, measurement device M, and registers R[1]-R[n] are the same as discussed above with respect to FIG. 2. The comparators C2 and C3 are similar to the one discussed above but have different thresholds. The comparator outputs are logically ANDed in the AND gate A1. The AND gate output indicates valid data.

When a diagnosis is desired, all registers are cleared (but the timer T2 discussed above is not cleared). After five intervals, registers R[1] and R[5] both contain data. The data are valid if the absolute value of the difference of the two discharge pressures dp is less than the discharge threshold, the absolute value of the difference of the two suction pressures is less than the suction threshold, and the system is not cycling. If any of these conditions is not met, another measurement is taken in 0.75 seconds and the compare operation is repeated. A gate G1 provides the most recent data that meets the comparator criteria for diagnosis. Convenient values for discharge and suction thresholds are four and two pounds, respectively. Also, the discharge and suction pressures in R[1] can be compared to the discharge and suction pressures in any register R[y], where y is greater than 1 and less than or equal to n; y can be the same as or different from x.

Figure 4:
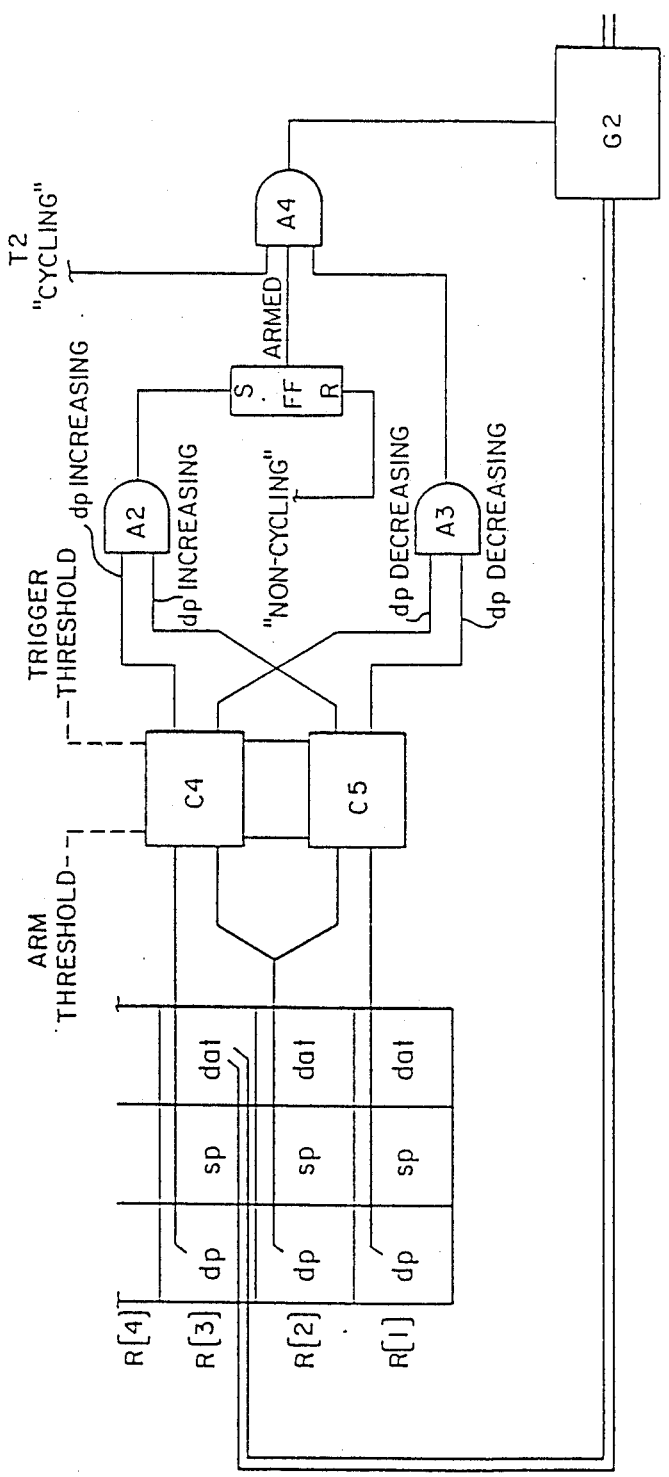
FIG. 4 is schematic, showing a system for determining valid data for cycling systems in accordance with the present invention.

It is evident that this system returns the first set of data where the discharge pressure has changed less than 4 pounds in 3 seconds and the suction pressure has changed less than 2 pounds in 3 seconds while the system is non-cycling The system for determining valid data for non-cycling systems is shown in FIG. 4. The timer T1, measurement device M and registers R[1]-R[n] are the same as discussed above with respect to FIGS. 2 and 3.

Comparator C4 presents the "increasing" signal if the discharge pressure dp in R[1] minus the discharge pressure dp in R[2] exceeds the ARM threshold; and presents the "decreasing" signal if the absolute value of the discharge pressure in R[2] minus the discharge pressure in R[1] exceeds the TRIGGER threshold. Comparator C5 similarly compares the discharge pressures dp in R[2] and R[3]. The ARM and TRIGGER thresholds can be set to any reasonable value. In practice, the device works well if both comparators have an ARM threshold of 1 pound and a TRIGGER threshold of 2 pounds.

The comparator outputs are logically ANDed in the AND gates A2 and A3. The output of A2 indicates the discharge pressure increased for two measurements in a row—that is, the discharge pressure in R[1] exceeds the discharge pressure in R[2] by two or more pounds and the discharge pressure in R[2] exceeds the discharge pressure in R[3] by two or more pounds. Similarly, the output of A3 indicates the discharge pressure has decreased for two measurements in a row.

The output of AND gate A2 sets a flip-flop FF, the output of which indicates an ARMED state. The flip-flop is reset if the air conditioner is not cycling. It is evident that the device is ARMED if the air conditioner is cycling and the discharge pressure is increasing.

The output of AND gate A4 presents data from register R[3] for diagnosis if the discharge pressure is decreasing while the device is ARMED and the air conditioner is cycling.

When a diagnosis is desired, all registers and the ARMED flip-flop FF are cleared (but the timer T2 discussed above is not cleared). After three intervals, registers R[1] and R[3] both contain data. When the discharge pressure starts increasing, the comparators C4 and C5, AND gate A2, and the flip-flop FF switch the device into the ARMED state. When the discharge pressure reverses and starts decreasing, the comparators C4 and C5, AND gate A3, and AND gate A4 open the GATE G2 and present the data from register R[3] for diagnosis.

It is evident that when the gate opens, the discharge pressure in R[3] represents the maximum discharge pressure. As previously described, all compare operations occur every measurement interval (0.75 seconds) until a maximum is found. Therefore, the system in FIG. 4 returns the first set of data that includes the maximum discharge pressure while the system is cycling.

To form a useful diagnostic system, the functions in FIGS. 2, 3, and 4 are all run simultaneously. For economy of the system, the registers R[1]–R[n], timer T1, and measurement device M can be shared. When the mechanic requests diagnosis, the system in FIG. 2 determines whether the air conditioner is cycling or non-cycling. The system in FIG. 3 will continuously look for stable data and, if stable data is found, will present the data for diagnosis if the system is non-cycling. The system in FIG. 4 continuously looks for data that includes the maximum discharge pressure or by using different comparators, the minimum suction pressure). It will present the first set of data that includes a maximum discharge pressure if the air conditioner is cycling.

Once a set of data is presented for diagnosis, the data from this device and the slowly-varying data (such as relative humidity and ambient temperature) are used to perform a diagnosis. The diagnosis is presented to the mechanic. The circuits in FIGS. 3 and 4 are reset (but the cycling timer T2 in FIG. 2 is not reset), and a new sort of data is searched for.

It is evident that this device continuously and automatically detects cycling and non-cycling air conditioners, presenting the best possible data for diagnostic evaluation. Further, if the device incorrectly determines whether the air conditioner is cycling (such as if the mechanic quickly changes engine RPM), the device will automatically correct its error and present correct data for the next diagnostic evaluation.

The diagnosis is initiated in a manner similar to that described above with respect to systems in which the clutch wiring is easily accessible. When the "Diagnose" function is selected, the video screen will give instructions to connect the evaporator input air temperature transducer 32a and the evaporator discharge air temperature transducer 32b. The ambient humidity transducer 150 and the ambient temperature transducer 152 will have been connected to the microprocessor. Suction pressure is monitored by pressure transducer 112, and discharge pressure is monitored by pressure transducer 52. The operator will be instructed to start the engine and set it at a selected R.P.M. He is then instructed to check all of the air conditioner controls As previously described the controls are required to be set for maximum cold temperature, and the blower (not shown) of the air conditioner 10 to be placed at its highest speed. The operator will be instructed to open both front doors of the automobile, and then to signal the microprocessor 100 when these steps have been accomplished. The diagnosis then proceeds as follows.

The video screen will signal if the ambient air temperature is outside a preselected range (of between 60° F. and 120° F.), which is the suitable temperature range for conducting tests. If there is sensed a condenser discharge pressure which is too high, such as above 350 psig, this excessive pressure will be displayed on the video screen with instructions to stop the test and correct the problem. Also, if the evaporator or suction pressure is excessive, such as above 150 psig, this information will be displayed with instructions to stop the test and to check hose connections. Assuming that these parameters are within acceptable limits, there will be displayed the names of various automobile manufacturers, and the operator will enter a signal designating the manufacturer of the automobile of which the air conditioner 10 under test is a part. There will then be displayed a menu providing different types of air conditioner systems which are in use including, by way of example, systems which have an expansion valve and a thermostatic switch, and a system having an expansion valve with a pressure switch. The operator will then enter into the register a signal representative of the type of air conditioner system under test. Microprocessor 100 will recognize whether the entered vehicle make and entered air conditioner type are conventional, known combinations, or not. If a selection has been made of, for instance, a manufacturer and a system type which stored data recognized as not being a known combination of data, the video screen will advise the operator that he has chosen an unusual combination of these data and ask if he wishes to change the selection. The operator is then given an opportunity to reenter his selections of vehicle manufacturer and air conditioner type, and this matter is corrected, if needed.

Microprocessor 100 has stored within it an acceptable range of ambient temperatures for conducting tests, and for each combination of car make and air conditioner type, a range of typical acceptable operating values, specifically, suction pressure, discharge pressure, discharge air temperature, and voltage and/or amperage of the clutch cycling probe 12a. Microprocessor 100 adjusts these values to correct for ambient temperature and/or humidity to provide an ambient adjustment factor for the acceptable range of values.

In particular, formulas have been developed, and are known to workers skilled in the art, of the acceptable ranges of these values. Discharge pressure value range is established by multiplying the ambient factor by approximately 2.55, plus or minus 20 psig. The acceptable suction pressure value range is established by the ambient factor multiplied by 0.5, minus 17, and plus or minus 5. Discharge air temperature value range is established based on the ambient factor times 0.03 plus 19, plus or minus 4; or 32, plus or minus 4, whichever is larger. However, it is now recognized that these relationships, to provide acceptable ranges of temperature and pressure, should be modified on the basis of the ambient relative humidity Therefore, the microprocessor 100 provides for modification of the ambient temperature factor in these relationships, so as to increase them as humidity increases above 30%. There is no modification if the humidity does not exceed 30% there is a 5% increase in the ambient temperature factor if the humidity is between 30% and 50%; there is an increase of 11% if the ambient relative humidity is between 50% and 70%, and if the ambient relative humidity is above 70%, the temperature factor is increased by 16%.

The part for the particular automobile manufacturer and air conditioner system type under diagnosis will then be supplied from the sensors with data as above noted, including ambient temperature and humidity, and will establish the acceptable discharge pressure range, the acceptable suction pressure range, and the acceptable evaporator discharge air temperature range, these acceptable ranges being varied, as above noted, where the sensed ambient relative humidity is above 30°. There is provided below a portion of a chart which is representative of a look-up table forming a part of the microprocessor 100. It will be understood that this representation is for a particular type or particular types of air conditioner and there would be other and different charts for other types of air conditioners within microprocessor 100:

ALL DISPLAYS

301 Ambient temperature is (110°). Diagnostic evaluation is only valid from 60° F. to 120° F.

302 Is the ambient temperature probe located in front of the condenser?

|  |  |  | IF 0.220 CCOT/THERMOSTATIC SWITCH |  |  |
|---|---|---|---|---|---|
| AMBIENT TEMP | DISCH PRES | SUCT PRES | DISCH TEMP | AMP PROBE |  |
| + | I | I | I | O | 301, 302, 303 |
| − | I | I | I | O | 301, 302, 303 |
| I | + | O | O | O | 304, 302, 305, 306, 307 |
| I | + | + | O | O | 304, 309, 308, 302, 305, 306, 307 |
|   | + | + | + | O | 304, 309, 310, 311, 302, 305, 306, 307 |
|   | − | O | O | O | 304, 312 |
|   | − | − | O | O | 304, 309, 312 |
|   | O | − | O | O | 309, 312, 323 |
|   | − | + | + | O | 304, 309, 310, 302, 312, 320 |
|   | − | − | − | O | 302 |
| O | O | O | O | O | 315 |
|   | O | − | + | O | 309, 310, 313, 307, 323 |
|   | − | − | + | O | 309, 310, 322, 313, 307 |
|   | O | − | − | O | 319 |
| I | I | I | I | − | 326 |
| I | I | I | I | * | 327 |
|   |   |   |   | ** | 313, 323 |
|   |   |   |   | −* | 313, 323, 325 |
|   |   |   |   | O* | 315 |

+ OVER  
− UNDER  
I IGNORE  
O WITHIN  
* CYCLING

303 If temperature reading is incorrect replace the probe.

304 Discharge pressure is (111).

305 Is condenser air flow restricted?

306 Over charge or air in the system—DUMP, EVACUATE AND RECHARGE, PRESS "PROCEED".

307 PROCEED (1) (If "PROCEED" display service screen go to dump and reclaim mode. When pump is "OFF" (0-PSIG) for 10 seconds. Proceed into the charge sequence-return to diagnosis.)

308 Check blower for low air flow.

309 Suction pressure is (112).

310 Discharge air temperature is (113).

311 Is the discharge temperature probe properly located?

312 Is hose connection secure and schrader depressed?

313 System low on charge—If charge is required press "PROCEED".

314 PROCEED (2) If "PROCEED" display evacuate and charge screen. When completed return to the diagnosis mode (add a line on the screen)

315 System diagnosed as normal.

316 Defective evaporator pressure control valve. (EPR-FOA-STV-)

317 Defective expansion valve.

318 Restricted receiver dryer.

319 Pressure switch not functioning properly.

320 Compressor or clutch malfunction.

322 Restricted orifice tube.

323 Defective thermostatic switch.

324 Check compressor control valve and O rings.

325 Expansion valve stuck open.

326 No power to the clutch.

As will be apparent, there are many different resulting situations, the numerals in the right hand column being, in effect, commands to display on the video screen the diagnosed fault, or, in the case of numeral 315, that there is no fault diagnosed. There is provided below a table of numerals and displays associated with each:

By using the microprocessor 100, and the inputting of data, the operator will be advised of the condition of the air conditioner under test, whether it is satisfactory or, if not, the probable causes of the malfunctions.

If, upon display of the initial menu, the operator selects the "Self-test" function, the program of the microprocessor determines if signals are passing to and being received by the components intended, and in the proper sequence; there is also a testing to determine if these components respond in the manner required, that is, for example, if a solenoid operated valve is signalled to move to the open position, whether it does so. By signals from a pressure transducer or switch adjacent to a solenoid valve, the microprocessor 100 can determine if the valve opens or not, and/or if the related conduit is open or blocked or partially blocked, since it will determine the time required for a drop in pressure of a certain amount, and a sensing that the pressure drop is less than the predetermined amount with a predetermined time will provide an indication of a malfunction in this mechanical part of the apparatus. Similarly, a part of the operation is the discharging of refrigerant from the makeup refrigerant storing tank 68, as for a period of time of two seconds, the microprocessor 100 sensing if the weight loss or amount discharged in that time is substantially equal to a predetermined weight loss or amount discharged, and if not, there will be an indication of malfunctions such as a problem with the scale 60 or alternate amount-determiner such as a flowmeter or a malfunction of the solenoid valve 74, conduit 72, etc. Thus, not only is there a self-checking of the electrical components, but also of mechanical components by the microprocessor 100.

Another function of the microprocessor 100 is a "help" function. The operator may not be aware how a test of the air conditioner 10 should be conducted. He can go to the apparatus 40, and key into the microprocessor 100 a signal for "help". The microprocessor will then display detailed instructions on, for example, how to determine if an expansion valve forming a part of the air conditioner 10 is operating satisfactorily. As the detailed instructions often contain a substantial amount of information, the microprocessor will reduce the size of the letters in order to display more information on the video screen than could otherwise be displayed, the smaller size letters being acceptable since the operator is adjacent to the apparatus 40 and therefore does not require larger sized letters, which are used for the ordinary operations. The larger size letters may be seen, of course, at a greater distance from the apparatus 40, as when the operator is at the vehicle, and following instructions provided by the video screen display dealing with performing functions at the vehicle.

The claims and the specification describe the invention presented, and the terms that are employed in the claims draw their meaning from the use of such terms in the specification. Some terms employed in the prior art may be broader in meaning than specifically employed herein. Whenever there is a question between the broader definition of such term as used in the prior art and the more specific use of the term herein, the more specific meaning is meant.

It will be obvious to those skilled in the art that various changes may be made without departing from the spirit of the invention, and therefore the invention is not limited to that shown in the drawing and described in the specification, but only as indicated in the appended claims.

What is claimed:

1. A method for determining the cause of a malfunction in an air conditioning system for providing cooled air having a variable speed compressor, a condenser and an evaporator, comprising:
    establishing ranges of acceptable system values including at least one of system suction pressure, system discharge pressure and evaporator discharge air temperature;
    (b) determining at least one of ambient humidity and temperature;
    (c) adjusting the ranges of acceptable system values dependent on at least one of ambient humidity and temperature;
    (d) acquiring actual system values including at least one of discharge pressure, suction pressure, and the temperature of evaporator discharge air; .
    (e) determining the relationship of at least one actual value to the adjusted range of the corresponding acceptable system value; and
    (f) determining possible causes of system malfunction based on the determined relationship between said at least one actual system value and said adjusted range of the corresponding acceptable system value.

2. The method of claim 1, wherein the ranges of acceptable system values are established initially including ambient temperature as a factor.

3. The method of claim 2, wherein the adjustment of the ranges of acceptable system values is by adjusting the ambient temperature factor in accordance with sensed ambient humidity.

4. The method of claim and further comprising establishing ranges of acceptable system values for each of a plurality of different air conditioning systems, wherein said sensing of system values is of one of said plurality of air conditioning systems, and wherein the relationship determination is the determining of the relationship of at least one acquired system value to the adjusted range of the corresponding acceptable system value for the air conditioning system of which the values are sensed.

5. The method of claim 1, and further comprising establishing a range of acceptable values of ambient temperature, determining if the sensed ambient temperature is within the acceptable range therefor, and indicating if the sensed ambient temperature is not within the acceptable range therefor.

6. A method for determining the cause of a malfunction in an air conditioning system having a variable speed compressor with operating clutch, a condenser and an evaporator comprising:
    (a) establishing ranges of acceptable system values including at least one of system suction pressure, system discharge pressure and evaporator discharge air temperature;
    (b) determining at least one of ambient humidity and temperature;
    (c) adjusting the ranges of acceptable system values dependent on at least one of ambient humidity and temperature;
    (d) acquiring successive sets of actual system values including at least discharge pressure, suction pressure, and the temperature of evaporator discharge air;
    (e) determining from the actual system values whether the system has a cycling or non-cycling clutch;
    (f) providing a valid set of actual system values based on whether the system has a cycling or a non-cycling clutch;
    (g) determining the relationship of at least one actual value of the valid set of system values to the adjusted range of the corresponding acceptable system value; and
    (h) determining possible causes of system malfunction based on the determined relationship between the at least one actual system value and the at least one acceptable system value.

7. The method of claim 6, wherein the ranges of acceptable system values are established initially including ambient temperature as a factor.

8. The method of claim 7, wherein the adjustment of the ranges of acceptable system values is by adjusting the ambient temperature factor in accordance with sensed ambient humidity.

9. The method of claim 6, and further comprising establishing ranges of acceptable system values for each of a plurality of different air conditioning systems, wherein said sensing of system values is of one of said plurality of air conditioning systems, and wherein the relationship determination is the determining of the relationship of at least one acquired system value to the adjusted range of the corresponding acceptable system value for the air conditioning system of which the values are sensed.

10. The method of claim 6, and further comprising establishing a range of acceptable values of ambient temperature, determining if the sensed ambient temperature is within the acceptable range therefor, and indicating if the sensed ambient temperature is not within the acceptable range therefor.

11. Apparatus determining the cause of a malfunction in an air conditioning system for providing cooled air having a variable speed compressor, a condenser and an evaporator comprising:
- (a) first storage means for storing ranges of acceptable system values including at least one of system suction pressure, system discharge pressure and evaporator discharge air temperature;
- (b) means for determining at least one of ambient humidity and temperature;
- (c) means for adjusting the ranges of acceptable system values dependent on at least one of ambient humidity and temperature;
- (d) means for acquiring actual system values including at least one of discharge pressure, suction pressure and the temperature of evaporator discharge air;
- (e) means for determining the relationship of at least one actual value to the adjusted range of the corresponding acceptable system value;
- (f) means for determining possible causes of system malfunction based on the determined relationship between at least one actual system value and at least one acceptable system value; and
- (g) means for displaying the possible causes of system malfunction.

12. Apparatus for determining the cause of a malfunction in an air conditioning system having a variable speed compressor with operating clutch, a condenser and an evaporator comprising:
- (a) first storage means for storing ranges of acceptable system values including system suction pressure, system discharge pressure, and evaporator discharge air temperature;
- (b) first measuring means for measuring at least one of ambient humidity and temperature;
- (c) adjusting means for adjusting the ranges of acceptable system values dependent on at least one of ambient humidity and temperature;
- (d) second measuring means for measuring a set of actual system values including discharge pressure, suction pressure, and evaporator discharge air temperature;
- (e) triggering means for triggering said second measuring means to quickly measure said set of actual system values at regular intervals;
- (f) second storage means for storing successive sets 1−n of said actual system values measured by said second measuring means;
- (g) determining and providing means for determining whether the air conditioning system has a cycling clutch or a non-cycling clutch and providing a valid set of actual system values based on whether the clutch is cycling or non-cycling;
- (h) relationship determining means for determining the relationship of at least one actual value of the valid set of actual system values to the adjusted range of the corresponding acceptable system value; and
- (i) diagnosing means for determining possible causes of system malfunction based on the determined relationship between at least one actual system value and at least one acceptable system value; and
- (j) means for displaying the possible causes of system malfunction.

13. The apparatus of claim 12, said determining and providing means comprising first digital means for determining whether said clutch is cycling or non-cycling, second digital means for providing a valid set of actual system values for a non-cycling clutch, and third digital means for providing a valid set of actual system values for a cycling clutch.

14. The apparatus of claim 13, said second storage means comprising a plurality of registers R[1]-R[n].

15. The apparatus of claims 14, said triggering means comprising a first timer,
said first digital means comprising first comparator means for comparing the absolute value of the difference between the discharge pressures stored in R[1] and R[x] to a preset first threshold, x being an integer greater than 1 and less than or equal to n, and a second timer for generating a signal if it detects output from said first comparator within a preset interval,
said second digital means comprising second comparator means for comparing the absolute value of the difference between the discharge pressure stored in R[1] and R[y] to a present second threshold, y being an integer greater than 1 and less than or equal to n, third comparator means for comparing the absolute value of the difference between the suction pressures stored in R[1] and R[5] to a preset third threshold, first AND gate means for receiving the output of said second timer and said first and second comparator means, and first gate means for receiving the output of said first AND gate means for providing the values in R[1] to said relationship determining means upon receipt of a signal from said first AND gate, and
said third digital means comprising fourth comparator means for comparing the absolute value of the difference between the discharge pressures stored in R[2] and R[3] to preset fourth and fifth thresholds, fifth comparator means for comparing the absolute value of the difference between the discharge pressures stored in R[1] and R[2] to the fourth and fifth present thresholds, second AND gate means for receiving the outputs of said fourth and fifth comparator means with respect to the fourth preset threshold, and third AND gate means for receiving the outputs of said fourth and fifth comparator means with respect to the preset fifth threshold, flip flop means for receiving the output from said second timer and said second AND gate means, fourth AND gate means for receiving the output from said second timer, said flip flop means, and said third AND gate means, and second gate means for receiving the output of said fourth AND gate means and providing the values in R[3] upon receipt of a signal from said fourth AND gate means to said relationship determining means.

16. A method for determining the cause of a malfunction in an air conditioning system having a variable speed compressor, a condenser and an evaporator, comprising:
- (a) establishing ranges of acceptable system values including at least one of system suction pressure, system discharge pressure and evaporator discharge air temperature;
- (b) determining at least one of ambient humidity and temperature;
- (c) adjusting the ranges of acceptable system values dependent on at least one of ambient humidity and temperature;
- (d) acquiring successive sets of actual system values including at least discharge pressure, suction pressure, and the temperature of evaporator discharge air;

(e) determining from the actual system values whether the system is cycling or non-cycling;
(f) providing a valid set of actual system values based on whether the system is cycling or non-cycling;
(g) determining the relationship of at least one actual value of the valid set of system values to the adjusted range of the corresponding acceptable system value; and,
(h) determining possible causes of system malfunction based on the determined relationship between the at least one actual system value and at least one acceptable system value.

17. The method of claim 16 wherein the ranges of acceptable system values are established initially including ambient temperature as a factor.

18. The method of claim 17 wherein the adjustment of the ranges of acceptable system values is by adjusting the ambient temperature factor in accordance with sensed ambient humidity.

19. The method of claim 16 wherein said determining of system cycling step is performed by analyzing compressor discharge pressures.

20. The method of claim 16 wherein said determining of system cycling step is performed by analyzing compressor suction pressures.

* * * * *